United States Patent Office 3,120,127
Patented Feb. 4, 1964

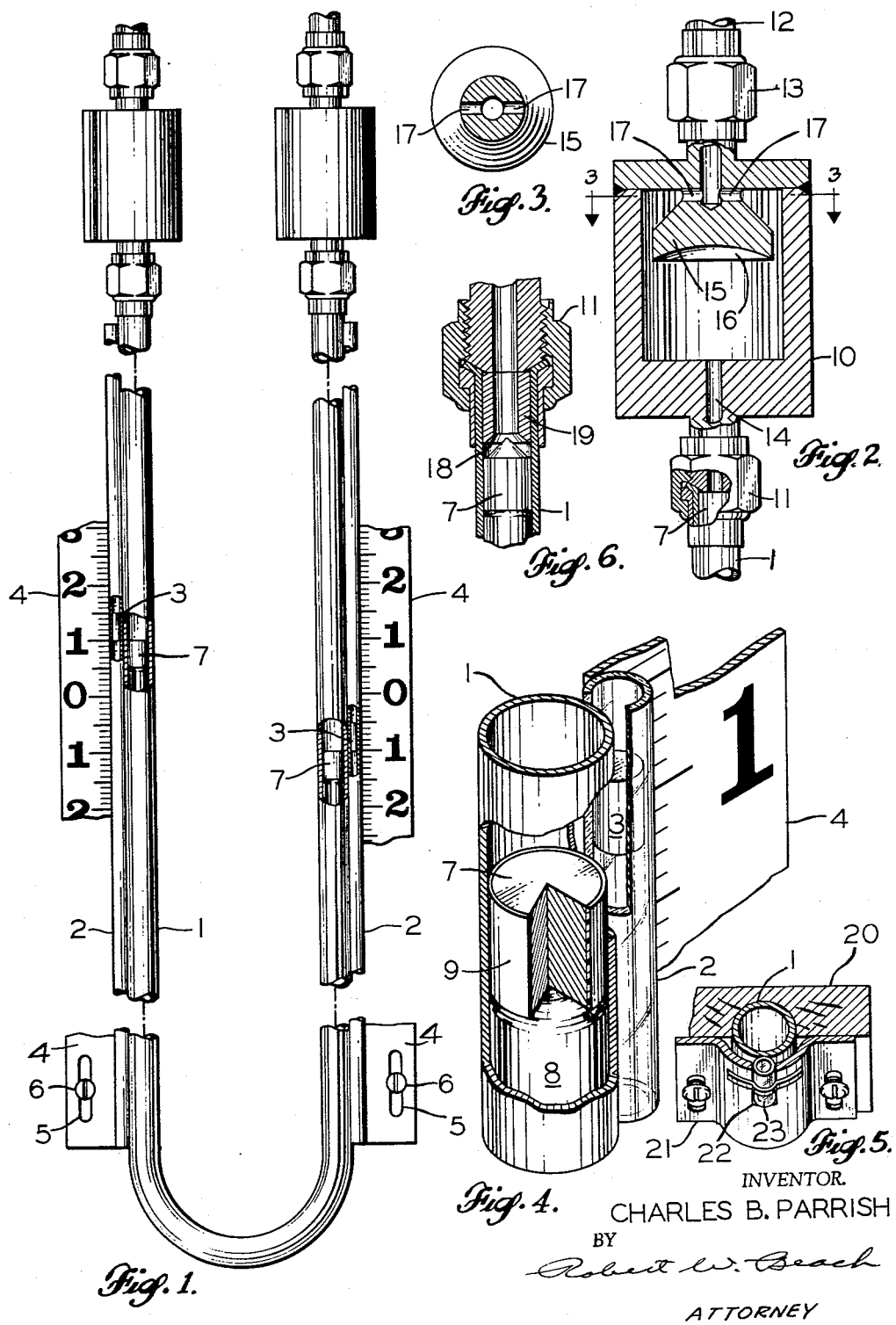

3,120,127
MANOMETER PRESSURE INDICATOR
Charles B. Parrish, 14719 57th Ave. S., Tukwila, Wash.
Filed Dec. 4, 1961, Ser. No. 156,889
3 Claims. (Cl. 73—401)

This invention relates to a pressure indicator for manometers subject to high pressure.

A principal object of the invention is to provide a pressure indicator for manometers which are subjected to pressure so high that transparent material cannot be relied upon to withstand the stresses to which the manometer tube is subjected, and consequently it is necessary to make the manometer tube of strong material, such as metal, which is opaque.

An incidental object is to provide such an indicator which is easy to read, and which will indicate variations in pressure over an extensive range.

Despite the extent of range of pressures which will be indicated by the indicator it is an object to enable an indication of high accuracy to be obtained.

A further object is to provide an indicator having the capabilities mentioned above which will be of simple construction and have a minimum number of moving parts while being reliable in operation and requiring a minimum of maintenance.

It is also an object when desired to enable the indicator to be used for the additional purpose of controlling the level of the flowable material in the manometer tube by serving as a valve to close the tube when the flowable material within it is subjected to excessive pressure.

A further object is to provide a safety arrangement which will conserve the flowable material in the manometer tube when it is subjected to excessive pressure even when the tube is closed imperfectly.

The foregoing objects can be attained by employing a pressure indicator for a manometer tube including a float element floating on flowable material in the manometer tube, which preferably is mercury, which cooperates with a follower member movable in a tube alongside the manometer tube. Interaction of the two elements can be provided by magnetic effect, at least one of the elements being a magnet and the other being of magnetizable material, but preferably both elements being magnets. The manometer tube should be of opaque nonmagnetic material, and the guide tube for the follower element should be transparent to enable movement of the follower element to be observed. A scale is provided adjacent to the guide tube relative to which the position of the follower element can be determined. Excessive movement of the indicating elements can be prevented when the flowable material in the manometer tube is subjected to excessively high pressures by arranging the float element to act as a valve virtually to close the passage through the manometer tube when it has risen to a predetermined height.

FIGURE 1 is a front elevation of a U-shaped manometer tube utilizing the present invention, parts being broken away and the upright legs of the U-tube being shown as of indeterminate length.

FIGURE 2 is a detail elevation of the upper portion of a U-tube installation including an overflow reservoir, with parts broken away, and FIGURE 3 is a transverse section on line 3—3 of FIGURE 2.

FIGURE 4 is an enlarged detail perspective of a portion of the manometer tube and indicator installation, with parts broken away.

FIGURE 5 is a transverse detail section through a portion of the manometer tube and the guide tube, showing an alternate scale arrangement.

FIGURE 6 is a longitudinal section through a portion of the manometer tube, illustrating an alternate structure of float element.

While the manometer to which the present invention is applicable may be either of the U-tube or of the single tube type, it is illustrated in the drawings as including the U-tube 1 of indeterminate length. The length of the U-tube selected will depend upon the range of pressures to be measured, but the indicating mechanism of the present invention is intended principally for use in manometers which will be subjected to pressures so high that it would be unsafe to make the tubes of glass in accordance with conventional practice. The accompanying drawing does not show any specific support for the manometer tube, but it will be understood that it can be supported in any conventional fashion. Preferably the manometer tube is embedded in a recess in a backing board so that it will be both adequately supported and considerably protected from being struck accidentally. Also different flowable materials might be used in the U-tube, but again because it is intended primarily for measuring large pressure it is preferred that the material in the U-tube be mercury.

Because of the high pressures to which it is anticipated the flowable material in the manometer tube will be subjected, such tube is made of material stronger than glass. For greatest safety it is preferred that the manometer tube 1 be made of metal, and a very strong metal suitable for the purpose is stainless steel. Such metal should be of a character which is nonmagnetic, because of the preferred type of indicating mechanism employed. When the manometer tube is made of transparent material it is possible to observe directly the height of the surface of the flowable material column in the manometer tube, which affords a direct indication of the pressure to which such flowable material is subjected. Such observation cannot be made if the material of the manometer tube is opaque.

The pressure indicator of the present invention requires the provision of an auxiliary tube 2 mounted alongside the manometer tube 1 and parallel to it. Where the manometer tube is of the U-tube type, as shown in FIG. 1, an auxiliary tube will be provided for each leg of the manometer tube, as shown in FIG. 1. This auxiliary tube will not be subjected to pressure above or below atmospheric pressure, and consequently can be made of any suitable transparent material, glass being entirely acceptable for this purpose. It is preferred that the transparent auxiliary tube be much smaller than the manometer tube so as to receive slidably within it a small indicating element 3, which may be moved lengthwise of the auxiliary tube in response to change in height of the surface of the flowable material in the adjacent manometer tube.

Alongside each of the auxiliary tubes 2 is mounted a scale 4, graduated in suitable increments of distance. In the case of a U-tube manometer, as shown in FIG. 1, the two scales alongside the two auxiliary tubes will be mounted so that their two zero points are located at the same level, and approximately at the level of the surface of the flowable material in each of the manometer tube legs 1, when such flowable material is not subjected to a pressure to be measured. To enable such adjustment of each scale to be made, the upper and lower portions of the scale may have in it a slot 5 through which a securing screw 6 extends to clamp the scale to a backing support in its properly adjusted position.

As part of the manometer pressure indicating mechanism a float element 7 of a specific gravity less than the flowable material 8 in the manometer tube is provided, which is of a size to be received slidably within the manometer tube 1 to float on the surface of the flowable material. If the flowable material is mercury the float element 7 can be of metal. While it is desirable to have such float element fit reasonably snugly in the manometer tube, it should be slidable freely lengthwise of such tube as the height of the flowable material column rises and descends. An advantage of making the manometer tube of metal is that it can be made of very uniform size, so that the fit of the float element in the tube will be uniform in all elevational positions.

In order further to facilitate movement of the float element within the manometer tube as the flowable material elevation changes it is desirable to provide a smooth peripheral surface on the floating element, and preferably one having slippery or lubricating characteristics. For this purpose the float element may be made in two parts, including a metal core and a hollow cylindrical shell 9, which may be assembled by the core being pressed into the shell. Such shell may be made of plastic material, such, for example, as Teflon (polytetrafluoroethylene), the slippery characteristics of which are well known. A float element of this construction will follow accurately the movement of the flowable material surface when such material is subjected to variations in pressure.

In order to enable the position of a follower element 3 relative to a scale 4 to indicate changes in height of the column of flowable material in the adjacent manometer tube it is necessary to provide an interaction between the manometer tube float 7 and the follower element 3. Such interaction can be effected by magnetic force if at least one of these elements is a magnet and the other is made of magnetizable material. Preferably both of these elements are magnets. Also the magnetic force utilized could be either magnetic attraction or magnetic repulsion.

In the particular form shown in FIGS. 1 and 4 of the drawings the force of magnetic repulsion is utilized to correlate the movement of the follower element 3 in response to movement of the adjacent float element 7. Both of these elements are magnetized and the follower element is placed in its auxiliary tube 2 above the follower element and related so that the lower end of the follower element and the upper end of the float element are of likely polarity. As shown in FIGS. 1 and 4, therefore, the follower element will be supported by magnetic repulsion in a position with its lower end substantially even with the upper end of the float element, depending upon the weight of the follower element and the intensity of the magnetic force reacting between the two elements. When the scales 4, as shown in FIG. 1, are adjusted initially, therefore, after the U-tube has been supplied with flowable material and the float elements 7 have been inserted in it, the zero points on such scales should be placed even with the lower ends of the follower elements 3. When pressure is exerted on the flowable material in the U-tube one follower element will therefore drop to the same extent that the other follower element is raised to locate their lower ends opposite corresponding index marks on the scales, as shown in FIG. 1.

In some instances the manometer tube may be subjected to a pressure sufficiently great so that the float element 7 is moved clear to the top of the manometer tube. Instead of the upper end of such tube being left open, therefore, it is preferred that an overflow reservoir 10 be mounted on its upper end by a coupling 11. A conduit 12 by which the manometer tube is subjected to positive or negative pressure is connected by a coupling 13 to the upper end of the overflow reservoir. The passage 14 between the bore of the manometer tube and the interior of the reservoir 10 is smaller than such manometer tube bore so that, as shown in FIG. 2, in the event that the flowable material should rise to the top of the manometer tube, the upper end of the float 7 will be pressed against the lower end of the stem projecting downward from the overflow reservoir to constitute a valve virtually sealing off the manometer tube from the reservoir.

Since it is necessary for the float element to have a sliding fit in the manometer tube it is possible that some flowable material may pass around the float element and be forced into the overflow reservoir. Such material cannot be projected upward into the tube 12, however, because a baffle 15 having a concave lower surface 16 is provided in the upper end of the overflow reservoir. The root of such baffle as shown in FIGS. 2 and 3 has passages 17 establishing communication from the pressure tube 12 to the interior of the overflow reservoir and thence to the interior of the manometer tube. Even if the fit of the upper end of float element 7 against the downwardly projecting stem of the overflow reservoir 10 should not effect a complete seal, therefore, no loss of flowable material from the manometer tube installation will be suffered.

A better seal between the overflow reservoir 10 and the manometer tube 1 can be effected if the shape of the upper end of the float element is made conical like that of the float 7' in FIG. 6 to fit a conical seat 18 on the lower end of a hollow plug 19 inserted in the upper end of the manometer tube. Such complemental conical surfaces can be formed to provide a better fit than flat surfaces. It will, of course, be necessary to make the plug 19 removable in order to enable the float elements and the flowable material in the manometer tube to be replaced or replenished.

In FIG. 5 an alternate form of manometer tube, auxiliary tube and scale arrangement is shown. In this instance the manometer tube 1 is received in a groove in a backing 20, and a scale plate 21 overlaps the manometer tube. In this scale plate is a slot 22 receiving the auxiliary tube 23 in which the follower element is slidable. In this instance, therefore, scale graduations may be provided at opposite sides of the auxiliary tube for easier reading. The auxiliary tube may be held in the slot 22 by suitable straps.

I claim as my invention:

1. In a manometer, an upright opaque manometer tube, a column of flowable material in said manometer tube subjected to pressure altering the height of said column in said tube, a permanent magnet float element floating on said column, an upright transparent tube, mounted alongside and parallel to said manometer tube and a permanent magnet follower element received slidably within said transparent tube at a location higher than said float magnet element and oriented so that the lower end of said follower element and the upper end of said float magnet element are of like magnet polarity for effecting mutual repulsion to sustain said follower magnet element in said transparent tube, effect upward movement thereof corresponding to upward movement of said float element in said manometer tube and prevent downward movement of said follower magnet element into horizontal registry with said float magnet element.

2. In the manometer defined in claim 1, the float element including a permanent magnet metal core and a shell of nonmagnetic slippery plastic material encircling said core.

3. In the manometer defined in claim 2, the plastic shell being of polytetrafluoroethylene.

References Cited in the file of this patent

UNITED STATES PATENTS

| | | |
|---|---|---|
| 1,396,560 | Dickinson | Nov. 8, 1921 |
| 1,858,399 | Jones | May 17, 1932 |
| 2,997,880 | Cook et al. | Aug. 29, 1961 |
| 3,020,757 | Parish | Feb. 13, 1962 |
| 3,024,659 | White | Mar. 13, 1962 |

FOREIGN PATENTS

| | | |
|---|---|---|
| 213,449 | Switzerland | May 1, 1941 |
| 898,985 | France | May 14, 1945 |
| 654,129 | Great Britain | June 6, 1951 |
| 1,128,015 | France | Jan. 2, 1957 |

OTHER REFERENCES

High-Pressure Differential Manometer, by Martin B. Biles, Instruments, vol. 24, February 1951, pp. 159 and 204.